Sept. 13, 1966 A. S. ZUKIN 3,273,142

CONVERSION SYSTEMS

Filed March 25, 1963 5 Sheets-Sheet 1

INVENTOR
ARTHUR S. ZUKIN,
BY
Walter J. Adam
ATTORNEY.

Sept. 13, 1966 A. S. ZUKIN 3,273,142

CONVERSION SYSTEMS

Filed March 25, 1963 5 Sheets-Sheet 2

INVENTOR.
ARTHUR S. ZUKIN,
BY Walter J. Adam
ATTORNEY.

Sept. 13, 1966 A. S. ZUKIN 3,273,142

CONVERSION SYSTEMS

Filed March 25, 1963 5 Sheets-Sheet 3

INVENTOR.
ARTHUR S. ZUKIN,
BY
Walter J. Adam
ATTORNEY.

Sept. 13, 1966 A. S. ZUKIN 3,273,142

CONVERSION SYSTEMS

Filed March 25, 1963 5 Sheets-Sheet 4

INVENTOR.
ARTHUR S. ZUKIN,
BY Walter J. Adam
ATTORNEY.

Sept. 13, 1966 A. S. ZUKIN 3,273,142

CONVERSION SYSTEMS

Filed March 25, 1963 5 Sheets-Sheet 5

TIME →

INVENTOR.
ARTHUR S. ZUKIN,
BY Walter J. Adam
ATTORNEY.

United States Patent Office 3,273,142
Patented Sept. 13, 1966

3,273,142

CONVERSION SYSTEMS

Arthur S. Zukin, Encino, Calif., assignor to Hughes Aircraft Company, Culver City, Calif., a corporation of Delaware Filed Mar. 25, 1963, Ser. No. 267,663
9 Claims. (Cl. 340—347)

This invention relates to conversion systems and particularly to improved digital-to-analog and analog-to-digital conversion systems.

Conventional devices for conversion of information between analog and digital forms that operate in a parallel manner require both analog and digital storage during the conversion process. In systems utilizing serial operation, the requirement for storage in flip flops of the numbers being operated upon may be avoided. However, conventional serial conversion devices depend upon critical or accurate values of digit rate or the rates of decay and charge of capacitors, which requirements limit the accuracy and reliability and require relatively complex circuit arrangements.

It is therefore an object of this invention to provide a new class of digital-to-analog and analog-to-digital conversion devices that operate serially with a minimum of complexity and equipment and with a high degree of accuracy.

It is another object of this invention to provide devices for conversion between digital and analog signals in which analog storage is utilized instead of digital storage during the conversion process.

It is still another object of this invention to provide digital-to-analog and analog-to-digital conversion devices that utilize a counter to provide weighting of analog values and two analog storage memories for accumulated storage of information.

It is a further object of this invention to provide digital-to-analog and analog-to-digital conversion devices that utilize two analog storage memories for accumulated storage of information and a feedback control arrangement for weighting of analog values. It is a still further object of this invention to provide analog-to-digital conversion devices in which an improved digital-to-analog conversion operation is utilized in a feedback arrangement.

Briefly, the conversion devices in accordance with this invention include a one binary-digit input register which applies a weighted signal to a summer. First and second analog memories are serially coupled between the output of the summer and an input thereof with a first switch coupled between the output of the summer and the first memory and a second switch coupled between the memories. During a first half cycle of operation, the first and second switches are respectively closed and opened so that digital input information and analog information stored in the second memory are summed and temporarily stored in the first memory. During the second half cycle the first and second switches are respectively opened and closed so that the information stored in the first memory is stored in the second memory. This cycle is repeated in response to additional binary inputs with the accumulated analog signal being stored in the second memory during each second half cycle. The weighting is performed by a counter-controlled analog weighting circuit or by controlling the feedback between the second memory and the summer. For analog-to-digital conversion the accumulated analog signal is compared with an analog input signal to set the input register to a second state or to allow it to remain at a normally reset first state. The binary states of the input register sampled at the ends of each of the steps provide the binary equivalent of the analog input signal.

The novel features of this invention, both as to its organization and method of operation, will best be understood from the accompanying description, taken in connection with the accompanying drawings, in which like reference characters refer to like parts, and in which.

Figure 1:
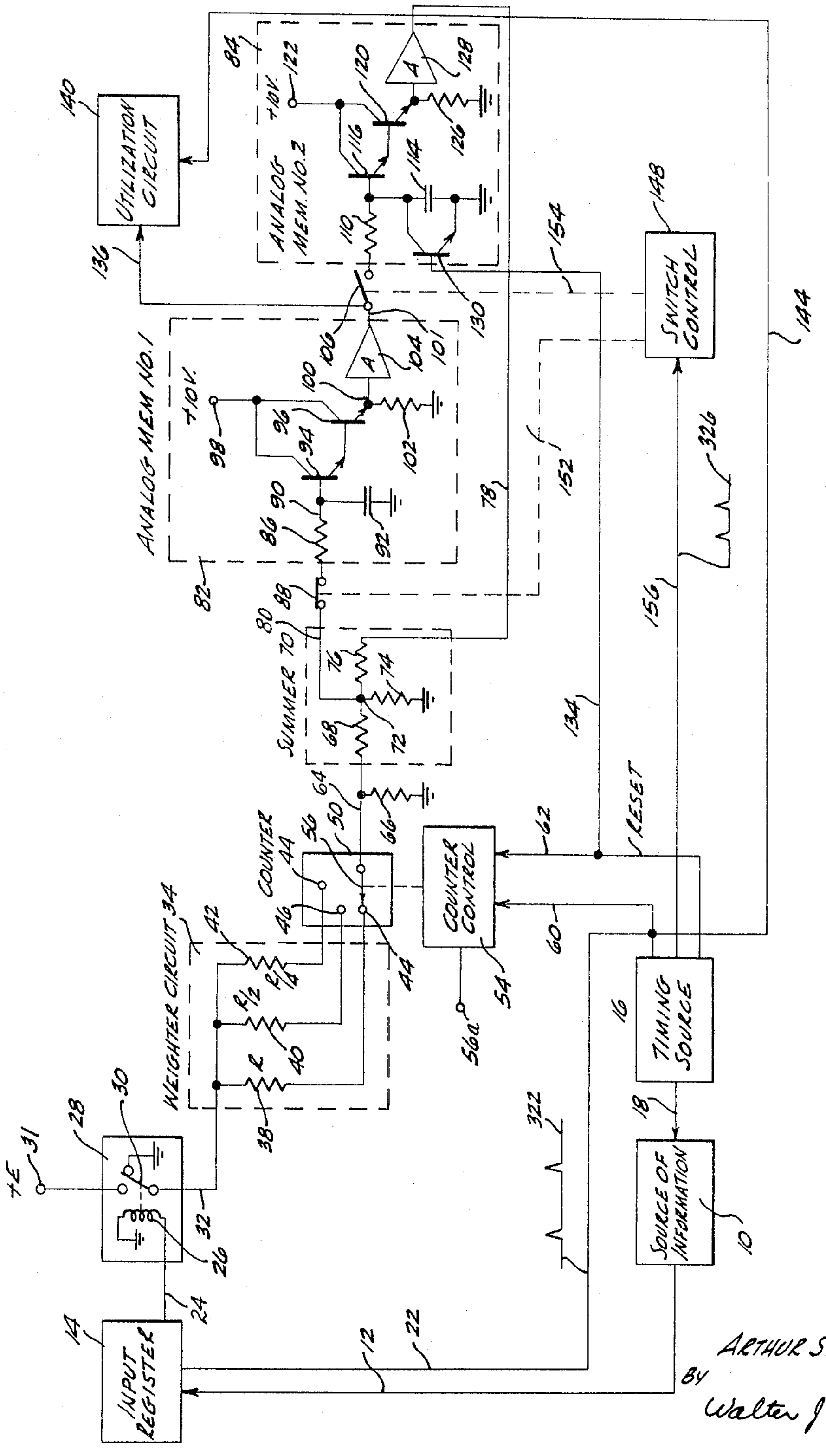
FIG. 1 is a schematic circuit and block diagram of a first arrangement of a digital-to-analog converter in accordance with this invention.

Referring first to the digital-to-analog conversion system of FIG. 1, a source of information 10 applies binary input signals through a lead 12 to a first input of an input register flip flop 14 for storing one binary bit at a time. A source of timing signals 16 develops suitable timing pulses which are applied through a lead 18 to control the clocking or transfer of the binary information to the register 14. Also, a suitable pulse is applied from the timing source 16 through a lead 22 to trigger or set the input register 14 to a "zero" state, for example, during each cycle of operation. The output of the input register flip flop 14 which provides a positive signal in response to a stored "one" is applied through a lead 24 to a solenoid coil 26 of a relay switch 28, the other end of the coil 26 being coupled to ground. In response to a binary "one" inserted into the input register 14 the coil 26 is energized and a switch arm 30 connects a suitable source of positive voltage +E of a terminal 31 to a lead 32 which in turn is coupled to a weighter circuit 34. Included in the weighter circuit 34 are resistors 38, 40 and 42 coupled between the lead 32 and respective terminals 44, 46 and 48 of a counter 50 which is shown as a stepping arrangement. In one arrangement in accordance with the invention in which three-bit binary input signals are converted to analog values, the resistors 38, 40 and 42 have respective proportional values R, R/2 and R/4. In order to control the counter 50, a counter control circuit 54 may be coupled through a suitable connection such as a mechanical connection to an arm 56 of the stepping arrangement. It is to be noted that in accordance with the invention other counter arrangements may be utilized such as conventional ring counters controlling diode or transistor switches. The counter control circuit 54 may include an adjustable switch **56*a* for varying the direction of movement of the arm 56 when deriving the analog equivalent of a series of least significant to most significant digits or a series of most significant to least significant digits applied to the input register 14. A timing signal is applied from the source 16 through the lead 22 and a lead 60 to the counter control circuit 54 for maintaining a count of the number of binary digits inserted into the input register 14. Also, to reset the counter 50 at the end of the conversion of a binary number to its analog quantity preparatory to starting conversion of a subsequent binary number, a reset signal is applied from the source 16 through a lead 62 to the counter control circuit 54**.

To develop voltage signals in response to the current passing through a selected resistor of the weighter circuit 34, the arm 56 is coupled to a lead 64 which in turn is coupled to ground through a resistor 66. The voltage signals on the lead 64 are applied to one end of a resistor 68 of a summing circuit or summer 70. The other end of the resistor 68 is coupled to a junction point 72 which in turn is coupled through a resistor 74 to ground, through a resistor 76 to a feedback lead 78 and to an output lead 80. It is to be noted that the invention is not to be limited to the example of the summer circuit shown, but any suitable summing arrangement may be utilized.

The converter system includes a first analog memory 82 for temporary storage of a summed analog value during a first half cycle of operation, and a second analog memory 84 for storage of the summed analog value during a second half cycle of operation. It is to be noted that the analog memory arrangement illustrated are only examples of a type which may be utilized in accordance with the invention. The first analog memory 82 includes a resistor 86 coupled through a first cycling switch 88 to the lead 80. The other end of the resistor 86 is coupled to a lead 90 which in turn is coupled to ground through a storage capacitor 92. To provide a relatively low forward impedance and a high impedance in the reverse direction, the lead 90 is coupled to the base of an npn type transistor 94 which in turn has an emitter coupled to the base of an npn type transistor 96, forming a conventional Darlington arrangement. The collectors of the transistors 94 and 96 are coupled to a suitable positive source of potential such as a +10 volt terminal 98. The emitter of the transistor 96 is coupled to a lead 100 which in turn is coupled through a resistor 102 to ground as well as to a suitable amplifier circuit 104. The amplifier 104 which may be required for impedance matching may have a gain of unity. A second cycling switch 106 is coupled from the amplifier 104 through a lead 101 to one end of a resistor 110 of the second analog memory 84. The other end of the resistor 110 is coupled to ground through a storage capacitor 114 as well as to the base of an npn type transistor 116. The emitter of the transistor 116 is coupled to the base of an npn type transistor 120 and the collectors of the transistors 116 and 120 are coupled to a suitable source of potential such as a +10 volt terminal 122, the transistors forming a Darlington arrangement similar to that of the first analog memory 82. The emitter of the transistor 120 is coupled to ground through a resistor 126 as well as to an impedance matching amplifier circuit 128 which may have unity gain. The feedback signal for the summing operation is applied from the amplifier circuit 128 through the lead 78 to the summer 70.

For resetting the second analog memory 84 prior to the conversion of a new binary number, an npn type transistor 130 may have a collector to emitter path coupled across the storage capacitor 114 and a base coupled to a lead 134 which in turn is coupled to the reset lead 62. The accumulated analog signal and the final analog signal are applied from the lead 101 through a lead 136 to a utilization circuit 140 which in turn may be controlled by a timing signal applied from the timing source 16 through the lead 22 and a lead 144.

The sequence of switching in accordance with this invention provides that the first switch 88 be closed and the second switch 106 be opened during a first half cycle and the first switch 88 be opened and the second switch 106 be closed during a second half cycle as determined by a switch control circuit 148 coupled to the switches 88 and 106 through suitable mechanical connections 152 and 154, for example. The switch control circuit 148 responds to a timing signal applied from the source 16 through a lead 156. The switch control circuit 148 may be a conventional relay arrangement responsive to a bi-stable circuit to sequentially close the switch 88 and open the switch 106 at a first time in response to a first timing pulse and open the switch 88 and close the switch 106 at a second time in response to a second timing pulse.

Figure 2:
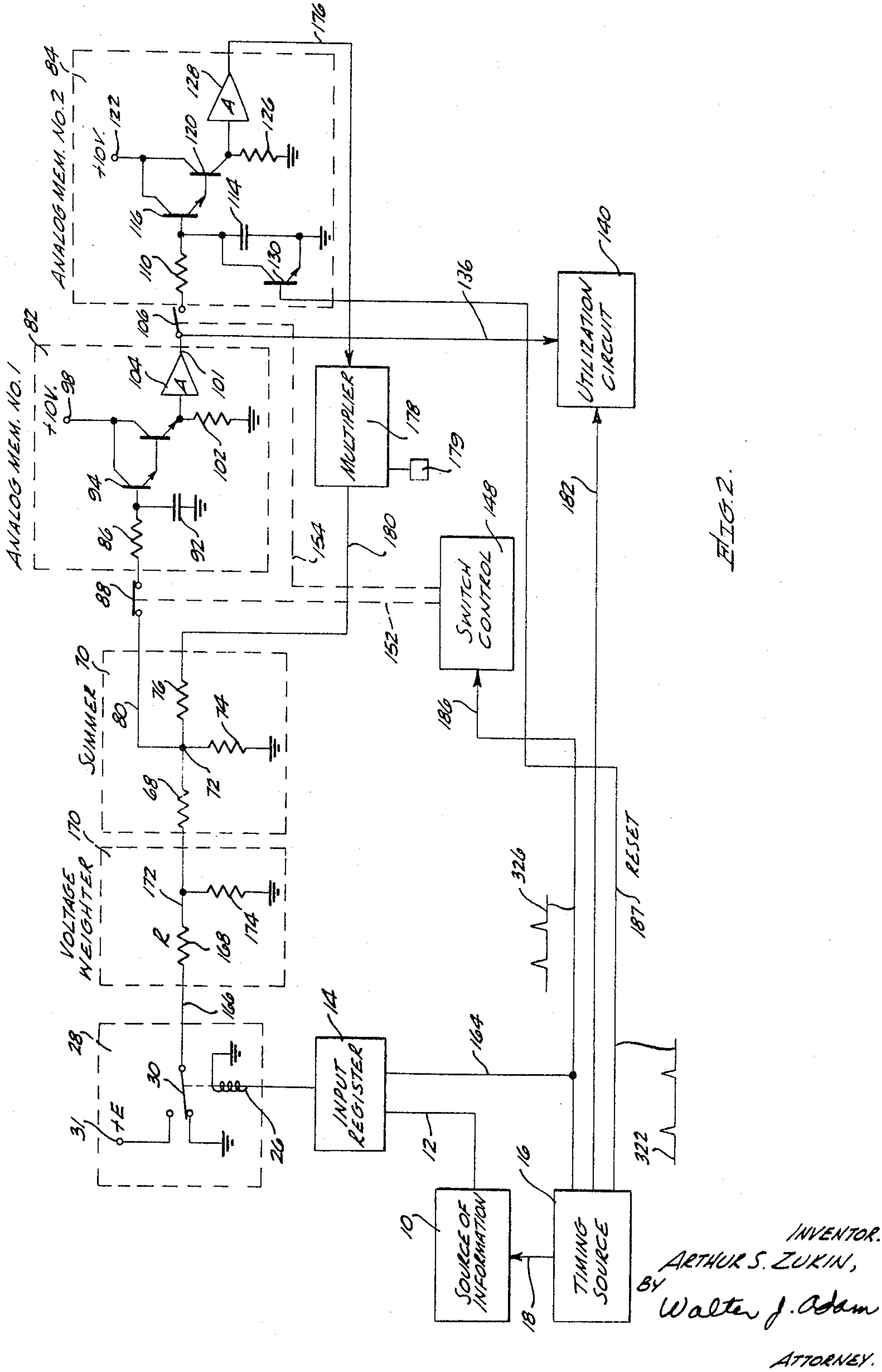
FIG. 2 is a schematic circuit and block diagram of a second arrangement of a digital-to-analog converter in accordance with the invention.

Referring now to FIG. 2, a second digital-to-analog converter in accordance with this invention utilizes a weighting arrangement in the feedback portion instead of a counter as utilized in the system of FIG. 1. A digit counter is not necessary in the arrangement of FIG. 2 because the weighting is selected explicity by the number of steps which have been performed. The input register 14 responds to binary signals applied from the source of information 10 through the lead 12 and is reset in response to a signal applied from the timing source 16 through a lead 164. The arm 30 of the switch 28 is coupled through a lead 166 to a resistor 168 of a fixed voltage weighter circuit 170. The other end of the resistor 168 is coupled to a lead 172 which in turn is coupled through a resistor 174 to ground to provide a voltage dividing operation and develop a voltage signal equivalent to the binary state of the input register 14. The lead 172 is coupled to the resistor 68 of the summer 70 which is similar to the summer of FIG. 1. Also, the arrangement of the first switch 88, the first analog memory 82, the second switch 106 and the second analog memory 84 are similar to that discussed relative to FIG. 1. The signals stored in the second analog memory 84 are applied from the amplifier 128 to a lead 176 which in turn is coupled to a weighting amplifier or multiplying circuit 178 which may provide either gain or attenuation as will be discussed in further detail subsequently. A switch 179 is provided to indicate that the multiplier 178 may be controlled to provide gain or attenuation and periodic variation thereof when converting some types of binary coded numbers. The amplified or attenuated signal developed by the multiplier 178 is applied through a lead 180 to the resistor 76 of the summing circuit 70. The utilization circuit 140 responding to the analog output signal on the lead 136 is similar to that of the arrangement of FIG. 1. A timing signal is applied through a lead 182 from the timing source 16 to the utilization circuit 140. The switch control circuit 148 is also similar to the arrangement of FIG. 1 and will not be explained in further detail. A timing signal is applied from the lead 164 through a lead 186 to the switch control circuit 148.

Figure 3:
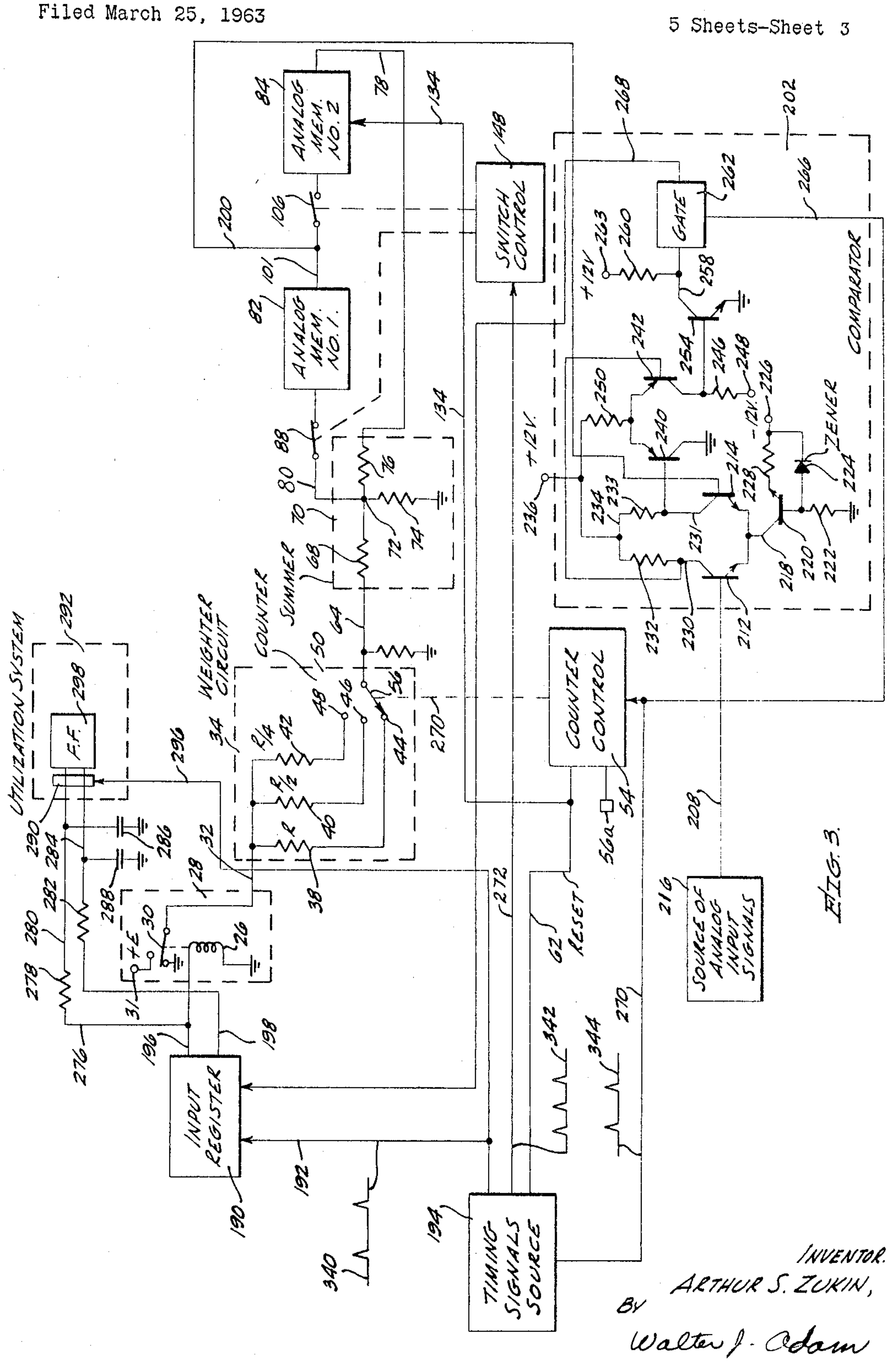
FIG. 3 is a schematic circuit and block diagram of a first arrangement of an analog-to-digital converter in accordance with the invention.

Referring now to an analog-to-digital conversion system in accordance with the invention of FIG. 3, an input register 190 which may be a one-bit binary flip flop responds to signals applied through a lead 192 from a source of timing signals 194 to be periodically set to the "one" state. The input register 190 has first and second output leads 196 and 198 with the lead 196 coupled to the switch 28 which is similar to that of FIG. 1. Also similar to the arrangement of FIG. 1 is the weighter circuit 34, the counter 50, the counter control circuit 54, the summer 70, the first switch 88, the first analog memory 82, the second switch 106, the second analog memory 84 and the switch control circuit 148. The analog voltage derived from the binary signal or sequences of binary "ones," for example, stored in the input register 190, is applied from the lead 101 through a lead 200 to a comparator circuit 202. Also, an analog input signal to be converted to a digital quantity is applied from a source of analog input signals 216 through a lead 208 to the comparator circuit 202. Thus, during each cycle a binary "one" is inserted into the input register 190 and the analog voltage equivalent to the binary digit and the accumulated results of previous steps is compared with the analog input signal to trigger the input register 190 to a "zero" state only when the stored analog voltage exceeds that of the analog input signal.

The comparator 202 may include, as an example, npn type transistors 212 and 214 provided in a differential arrangement with the base of the transistor 212 coupled to the lead 208 and the base of the transistor 214 coupled to the lead 200. The emitters of the transistors 212 and 214 are coupled to a lead 218 which in turn is coupled to the collector of an npn type transistor 220 of a constant current source. The base of the transistor 220 is coupled through a resistor 222 to ground as well as through the anode to cathode path of a zener diode 224 to a suitable source of potential such as a −12 volt terminal 226. The emitter of the transistor 220 is coupled through a resistor 228 to the −12 volt terminal 226. The collector of the transistor 212 is coupled through a lead 230 and a resistor 232 to a lead 234 which in turn is coupled to a suitable source of potential such as a +12 volt terminal 236. The collector of the transistor 214 is coupled to a lead 231 and through a resistor 233 to the lead 234. A second differential arrangement is provided including pnp type transistors 240 and 242 having respective bases coupled to the lead 231 and to the lead 230. The collector of the transistor 240 is coupled to ground and the collector of the transistor 242 is coupled through a resistor 246 to a suitable source of potential such as a −12 volt terminal 248. The emitters of the transistors 240 and 242 are coupled through a resistor 250 to the +12 volt terminal 236. The collector of the transistor 242 is coupled to the base of an npn type transistor 254 which in turn has an emitter coupled to ground and a collector coupled to a lead 258. A resistor 260 is coupled from the lead 258 to a suitable source of potential such as a +12 volt terminal 263 for developing a gating pulse. The signal on the lead 258 is applied to a gate 262 which in response to a timing signal applied from the timing source 194 through a lead 266 applies a positive signal through a lead 268 to an input terminal of the input register flip flop 190 when the analog voltage on the lead 200 exceeds that on the lead 208.

The counter control circuit 54 responds to a stepping signal applied from the source of timing signals 194 through a lead 270 as well as to a reset signal applied thereto through the lead 62. Also, the reset signal is applied through the lead 134 to the second analog memory 84. The switch control circuit 148 also responds to a timing signal applied from the source 194 through a lead 272.

The binary output signals are derived from the output leads 196 and 198 of the input register 190 at the end of each comparison operation. The lead 196 is coupled to a lead 276 and to one end of a resistor 278 having the other end coupled to a lead 280. The output lead 198 which may be the other output terminal of a conventional flip flop is coupled to a resistor 282 which in turn is coupled to a lead 284. The leads 280 and 284 are coupled to ground through respective capacitors 286 and 288 so as to provide R–C delay networks and allow information to be read from the register 190 substantially at the same time that the flip flop is being reset. It should be understood that the delay networks may not be required in some arrangements in accordance with the invention, but that it is only necessary that the content of the register is sensed before changed. The delayed signals on the leads 280 and 284 are applied to a gate 290 which may be included in a utilization system 292. The gate 290 which may include separate gates for each of the leads 280 and 284 responds to a timing signal applied from the source 194 through a lead 296. The binary signals gated through the gate 290 may be applied to a flip flop 298 for being shifted into other registers (not shown) of the utilization system 292. Thus, the binary state of the input register 190 is periodically interrogated to provide a binary equivalent number of the analog input signal applied from the source 206. It is to be noted that the analog-to-digital arrangement of FIG. 3 incorporates the digital-to-analog conversion system of FIG. 1 therein except that the input register 190 is initially set to a selected constant binary state for each cycle of operation.

Figure 4:
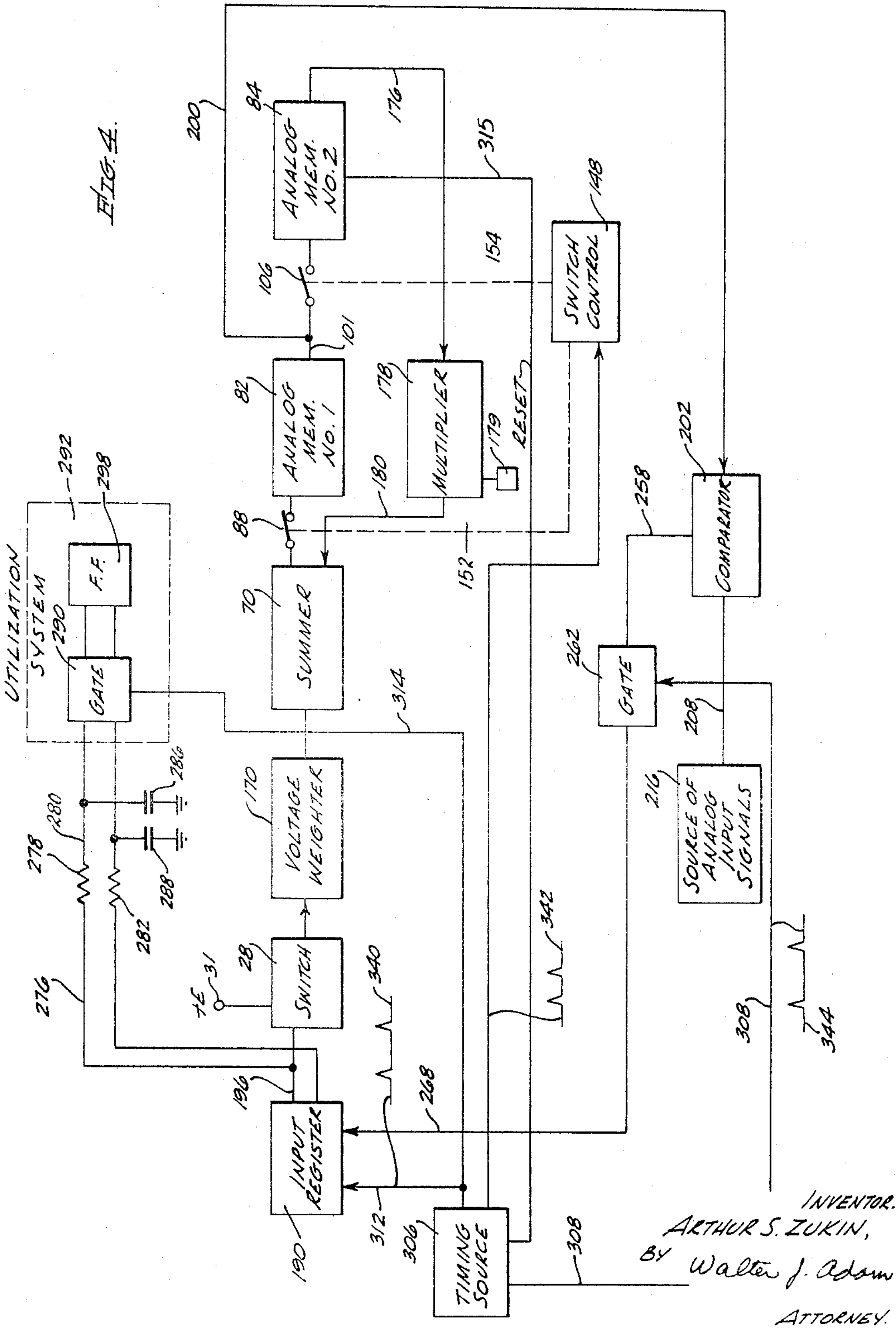
FIG. 4 is a schematic circuit and block diagram of a second arrangement of an analog-to-digital converter in accordance with the invention.

Referring now to FIG. 4, a second analog-to-digital converter system in accordance with this invention incorporates the digital-to-analog converting elements of FIG. 2 including the switch 28, the voltage weighter 170, the summer 70, the first switch 88, the first analog memory 82, the second switch 106 and the second analog memory 84. Also included in the arrangement of FIG. 4 is the weighting amplifier or multiplier circuit 178, the switch control circuit 148 and the switch control connections 152 and 154. The analog signal derived from the lead 101 is applied through the lead 200 to the comparator circuit 202 which may be similar to that described relative to the arrangement of FIG. 3. The source of analog input signals 216 applies the signal through the lead 208 to the comparator 202 which in turn is coupled through the lead 258 to the gate 262 similar to the arrangement of FIG. 3. The gate 262 responds to a timing signal applied from a timing source 306 through a lead 308 to apply a signal through the lead 268 to the input register 190 after a predetermined comparison operation. The input register 190 which is similar to that of FIG. 3 is set to a binary "one" state in response to a timing signal applied from the timing source 306 through a lead 312. The binary output signal is derived from the input register 190 and applied through the delay arrangement to the gate 290 of the utilization system 292 also similar to the arrangement of FIG. 3. The gate 290 is controlled by a timing signal applied from the timing source 306 through a lead 314. The second analog memory 84 is reset by a timing signal applied from the timing source 306 through a lead 315. Thus it may be seen that the analog-to-digital conversion system of FIG. 4 substantially includes the digital-to-analog conversion arrangement of FIG. 2.

Referring now to FIG. 1 and to the waveforms of FIG. 5, the digital-to-analog operation thereof will be explained in further detail. A reset pulse of a waveform 318 is applied through the lead 62 to reset the counter 50 to an initial state at which, for example, the arm 56 may contact the terminal 44 when the binary input signal is being serially applied to the input register 14 with the most significant digit first. Also, the reset pulse of the waveform 318 is applied through the lead 134 to the base of the transistor 130 to discharge the capacitor 114 so that both plates are at ground potential. This reset operation may be performed prior to applying a binary number to the input register 14. At time $t_0$, a digital input signal of a waveform 320 representing a binary "one," for example, may be applied from the source 10 to the input register 14. It is to be noted that the input register flip-flop 14 was previously set to a binary "zero" state in response to a pulse of a waveform 322 on the lead 22 and only a positive pulse of the waveform 320 triggers the input register flip flop 14 to the "one" state. Also, at time $t_0$ a switch control timing signal of a waveform 326 is applied through the lead 156 to the switch control circuit 148 to close the first switch 88 and open the second switch 106. In response to the triggering of the input register flip flop 14 to the "one" state, the relay coil 26 is energized and the switch arm 30 connects the source 31 to the lead 32 passing current through the resistor 38, the arm 56 and the resistor 66 to ground. Thus a positive analog voltage is applied to the lead 64 representing a binary "one" input signal. Because the switch 106 is open, only the voltage stored in the capacitor 114 of the second analog memory 84 as well as the voltage on the lead 64 are applied to the summing circuit 70. Because at time $t_0$, the stored voltage in the second analog memory 84 has been reset to "zero," the summed signal is only the voltage on the lead 64 which is applied to the storage capacitor 92 of the first analog memory 82. With the storage of the summed signal in the first analog memory 82, the first half cycle of operation is completed.

At time $t_1$ the pulse of the waveform 326 applied to the switch control circuit 148 opens the first switch 88 and closes the second switch 106. As a result the voltage stored on the capacitor 92 is applied through the amplifier 104 to the capacitor 114 so that the same voltage is stored and maintained in the second analog memory 84. The electrons may flow from the ungrounded plate of the capacitor 114 into voltage sources (not shown) in the amplifier 104. Also, at time $t_1$ in response to the counter control signal of the waveform 322, the arm 56 moves to the terminal 46 preparatory for the succeeding cycle. It is to be noted that the switch 88 is opened so that the voltage stored on the capacitor 92 is not disturbed by changes of voltage applied to the summer 70. Also the input register flip flop 14 is reset to "zero" at time $t_1$ in response to a pulse of the waveform 322 applied thereto from the timing source 16 through the lead 22. Thus the second half cycle is completed with the summed signal value in the analog memory 82 transferred to the second analog memory 84 as an analog voltage of a waveform 328. Also at time $t_1$, the analog output signal of a waveform 328 may be sampled in response to the signal of the waveform 322 applied thereto through the lead 144, by suitable arrangements (not shown) in the utilization circuit 140. It is to be noted that if only the total equivalent analog voltage of a series of binary inputs is required by the utilization circuit 140, the voltage is not sampled at time $t_1$. Because the summed analog signal is applied to the lead 101 shortly after time $t_0$, this sampling by the utilization circuit 140, if desired, may occur at other times between time $t_0$ and time $t_2$.

During the second half cycle of operation at time $t_2$ the signal of the waveform 326 is applied to the switch control circuit 148 through the lead 156 and the first switch 88 is again closed and the second switch 106 is opened. Also at time $t_2$, a binary input of the waveform 320 which may be a "one" is applied to the input register flip flop 14. The input register 14 which was reset to a "zero" state at time $t_1$ in response to the pulse of the waveform 322 is triggered to the "one" state at time $t_2$, closing the switch 28. Thus, current flows from the terminal 31 through the resistor 40, the arm 56 and the resistor 66 to ground applying a voltage to the lead 64 which is the analog equivalent of the weighted binary "one" input. The accumulated analog voltage of the waveform 328 is applied from the second analog memory 84 through the lead 78 to the summer 70. Thus, a summed voltage of the accumulated voltage and the binary input voltage as shown by the waveform 328 is stored in the capacitor 92 of the first analog memory 82.

At time $t_3$, which is the start of the second half of a cycle of operation, the switch control signal of the waveform 326 is applied to the switch control circuit 148 to open the first switch 88 and close the second switch 106. Thus, the voltage stored on the capacitor 92 is applied to the capacitor 114. It is to be noted that during the summing operation of the previous half cycle, the voltage developed by the summer 70 is rapidly stored on the capacitor 92 because that capacitor was substantially at the same value as derived from the second analog memory 84 except for the additional analog input voltage. Also at time $t_3$ in response to the counter control signal of the waveform 322 the arm 56 is moved to contact the terminal 48 as the previous input signal is counted. The signal of the waveform 322 also resets the input register 14 to the "zero" state. Thus, substantially at time $t_3$ the stored analog information is duplicated or transferred to the second analog memory 84. Also at time $t_3$ in response to the signal of the waveform 322 the analog output voltage of the waveform 328 is sampled by the utilization circuit 140 if an intermediate analog voltage is desired.

At time $t_4$ in response to the switch control pulse of the waveform 326 on the lead 156 the switch 88 is closed and the switch 106 is again opened. At time $t_4$ a "zero" binary input of the waveform 320 may be applied from the source 10 to the input register flip flop 14 which remains in the reset or "zero" state as previously determined by the signal of the waveform 322 at time $t_3$. Thus, the switch 28 remains open and only ground voltage is applied to the lead 64 which is representative of a "zero" binary input. The accumulated analog voltage of the second analog memory 84 is applied through the lead 78 to the summer 70 and stored in the capacitor 92 of the first analog memory 82. Thus the voltage at the lead 101 does not increase in value at time $t_4$ as indicated by the solid line position. However, if a binary "one" had been applied to the register 14 at time $t_4$ as indicated by the dotted pulse of the waveform 320, the analog voltage of the waveform 328 would increase as indicated by the dotted voltage rise. At time $t_5$ in response to the switch control signal of the waveform 326 the switch 88 again opens and the switch 101 closes to store the voltage of the first analog memory 82 in the second analog memory 84. I response to the pulse of the waveform 322, accumulated analog information may be transferred to the utilization circuit 140. The input register 14 is also reset in response to a pulse of the waveform 322. It is to be noted that in an arrangement in which the utilization circuit 140 only requires the total analog equivalent of the three-bit binary input, the sampling thereof may occur only at time $t_5$ in response to a single pulse (not shown) which may be developed by the timing source 16. A reset pulse of the waveform 318 may be applied at time $t_6$ to discharge the capacitor 114 and reset the counter control circuit 54. Because the operation in accordance with this invention continues in a similar manner it will not be explained in further detail.

It is to be noted that the arrangement in accordance with this invention is not to be limited to the weighting circuit 314 or the three-bit input described, as binary numbers of any number of bits may be utilized by including more proportional resistors in the weighter control 34 and additional contacts in the counter 50. It is to be also noted that in the arrangement described, the binary number was applied in a sequence of the most significant digit to the least significant digit but the system in accordance with the invention operates equally well when the binary number is applied to the input register 14 in a sequence of least significant digit to most significant digit. The counter direction control 56 may be varied so that the arm 56 sequentially contacts the contacts 48, 46 and 44 for deriving the analog equivalent of a binary number presented with the least significant digit first. Also in accordance with the invention, when utilizing decimal binary codes, a suitable weighting circuit and counter arrangement may be provided. Thus, in the arrangement of FIG. 1, the weighter circuit provides an analog signal equal to the product of the value ("one" or "zero") of the bit in the register multiplied by a weighting factor proportional to the place significance of the digit position being operated upon, that is for example, a weighting of $2^K$ would be given to the K digit position to the right of the binary point when responding to a number in the sequence of most significant digit to least significant digit.

Figure 5:
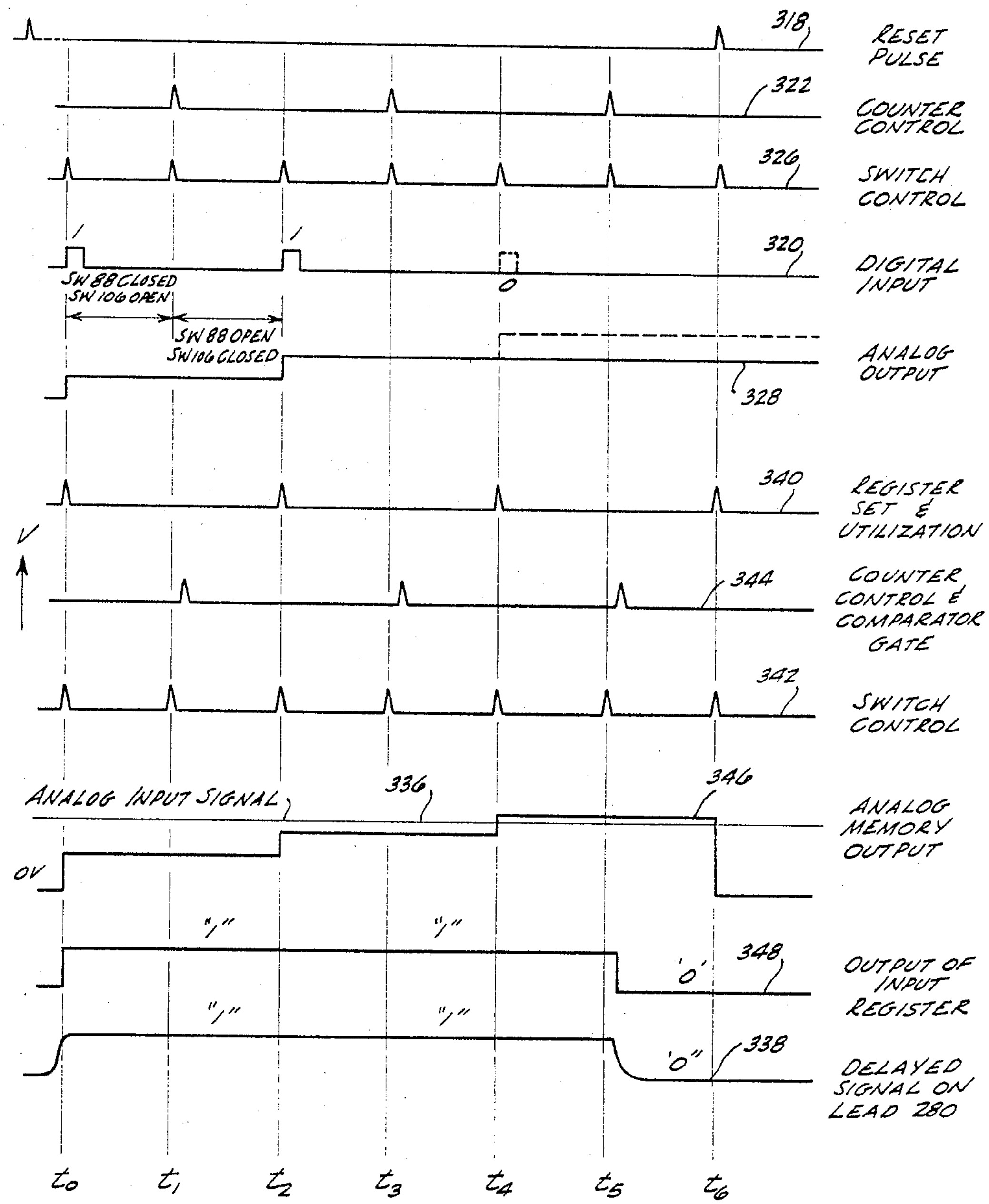
FIG. 5 is a schematic diagram showing waveforms of voltage versus time for further explaining the operation of the converters in accordance with the invention.

Referring now to FIGS. 2 and 5, the operation of the system is similar to that of the system of FIG. 1 except the weighting of individual digits is obtained by a repeated multiplication of the accumulated analog voltage in the memory 84 by either 2 or by ½, for example. The feedback amplifier 178 will provide multiplication by 2 when the most significant digit is operated upon first and will provide attenuation so as to multiply by ½ when the least significant digit is operated upon first. Thus, the weighting is selected by the number of steps which have been performed. For purposes of explanation it will be assumed that the most significant digit is first applied to the input register 14 and that the amplifier 178 is adjusted to provide multiplication by 2 of the accumulated analog value. At time $t_0$, the system having been reset in response to a pulse of the waveform 318 discharging the capacitor 114, a binary "one" of the waveform 320 is inserted into the input register flip flop 14. Also at time $t_0$ in response to the signal of the waveform 326 applied through the lead 186 to the switch control circuit 148 the first switch 88 is closed and the second switch 106 is opened. The switch 28 is closed in respone to the input register 14 and current flowing from the terminal 31 and through the resistors 168 and 174 develops an analog voltage on the lead 172 which is equivalent to the binary "one" and is applied to the summer 70. Because this is the start of a conversion operation and the capacitor 114 has been discharged, "zero" analog signal or ground potential is applied to the summer 70 from the lead 180. Thus the summed voltage of the waveform 328 representing the "one" binary input is stored in the capacitor 92 of the first analog memory 82 as electrons flow from the plate connected to the base of the transistor 94 through the summer 70 and to the terminal 31. Therefore, the first half cycle operation is completed.

At time $t_1$ in response to the switch control pulse of the waveform 326 applied through the lead 86 to the switch control circuit the first switch 88 is opened and the second switch 106 is closed to transfer the analog voltage value stored in the capacitor 92 to the capacitor 114. The electrons may flow from the plate of the capacitor 114 connected to the base of the transistor 116 to a voltage source in the amplifier 104 or to the terminal 98. It is to be noted that the same voltage remains stored in the capacitor 92. Also at time $t_1$ in response to a pulse of the waveform 322 the stored analog information may be transferred to the utilization circuit 140 if the step by step analog value is to be utilized. The input register 14 is reset to "zero" in response to the pulse of the waveform 326. It is to be noted that at time $t_0$ the wider pulse of the waveform 320 set the register 14 to "one" even though a short pulse of the waveform 126 was applied thereto. Thus the second half cycle of conversion operation is completed and the analog output voltage on the lead 136 may have the value shown by the waveform 328.

At time $t_2$ which is the start of the next cycle of operation, the switch control circuit 148 responds to the pulse of the waveform 326 to close the switch 88 and to open the switch 106. Also at time $t_2$, a binary "one" input signal of the waveform 320 may be applied to the input register 14 to energize and close the switch 28. Thus the analog equivalent of the binary "one" is applied from the lead 172 to the summer 70 and the stored analog voltage in the second analog memory 84 is applied to the multiplier 178. Because the multiplier 178 has been adjusted for multiplication by 2, the multiplied voltage is applied to the lead 180 and summed with the voltage on the lead 172. The accumulated voltage is stored on the capacitor 92. At time $t_3$ in response to the switch control pulse ofthe waveform 326 the first switch 88 is opened and the second switch 106 is closed to store on the capacitor 114 the voltage on the capacitor 92. Also at time $t_3$ in response to the pulse of the waveform 322 applied to the lead 182 the accumulated analog voltage of the waveform 328 may be transferred to the utilization circuit 140. The operation continues in a similar manner with the binary "zero" being applied to the input register 14 at time $t_4$. Because "zero" analog input is added to the accumulated voltage between times $t_4$ and $t_5$, the total analog equivalent of the three-bit binary input remains at a constant level as shown by the waveform 328. This voltage may be sampled at time $t_5$ in response to the pulse of the waveform 322. It is to be noted that as discussed relative to FIG. 1, if only the total analog equivalent is to be utilized, a timing pulse may be applied to the lead 182 only at time $t_5$. The circuit may be reset at time $t_6$ in response to a pulse of the waveform 318. The operation of the system of FIG. 2 continues in a similar manner and will not be explained in further detail.

The arrangements in accordance with this invention are not to be limited to a straight binary coding arrangement but are equally applicable to other types of binary codes. For a binary coded decimal number, the attenuation or amplification in the amplifier 178 should be the ratio of the numerical values of succeeding binary digits. For example, with simple binary coded decimal codes, the ratio between successive binary digits of the same decimal digit would be 2 to 1 while the ratio between the most significant binary digit of one decade and the least significant binary digit of the next higher decade would be 10 to 8 or 1¼ to 1. This operation may be accomplished with a conventional gain or attenuation control in the amplifier 178 indicated by the control 179 which may respond to predetermined signals applied from the timing source 16. It is to be noted that the digital-to-analog arrangements in accordance with this invention may operate in response to either positive or negative binary input pulses by reversing the circuit polarities in an appropriate manner.

To further generalize the operation of the circuit of FIG. 2 the analog quantity on the output lead 136 when operating first upon the least significant binary bit at the end of $P+1$ steps will represent the sum of the $(P+1)$ digit plus ½ times the P digit plus $(½^2)$ times the $P-1$ digit plus $(½^3)$ times the $(P-2)$ digit plus $(½^4)$ plus . . . plus $½^P$ times the first digit. Thus in the arrangement of FIG. 2 the digital quantity is added to the analog quantity bit by bit with each bit being weighted by a proper power of ½ to give the proper analog value, when converting the least significant digit first. Also as shown in the example, if the most significant digit is processed first the values are added with each bit being weighted by a proper power of 2.

Referring now to FIGS. 3 and 5, the analog-to-digital converter responds to an analog input voltage of a waveform 336 on the lead 208 to develop a digital output signal represented by a delayed signal on the lead 280 of a waveform 338. At time $t_0$ in response to a register set pulse of a waveform 340 applied from the source 194 through the lead 192 to the input register 190, the flip flop is set to the binary "one" state, for example. Also at time $t_0$ in response to the pulse of a waveform 342 the first switch 88 is closed and the second switch 106 is opened. It is to be noted that prior to time $t_0$ in response to a reset pulse similar to the waveform 318 the counter control 54 has been set so that the arm 56 connects with the terminal 44 and the second analog memory 84 has been discharged to a "zero" voltage state. Thus as described relative to FIG. 1, the analog equivalent of a binary "one" is applied to the summer 70 and stored in the first analog memory 82.

Shortly after time $t_1$ a signal of a waveform 344 is applied to the lead 270 to change the counter to the next count and is applied through the lead 266 to the gate 262. It is to be noted at this time that the signal of the waveform 344 may be delayed slightly in time from time $t_1$ and subsequent periods by a conventional delay arrangement. At time $t_1$ in response to the switch control signal of the waveform 342 the first switch 88 is opened and the second switch 106 is closed to transfer the stored analog information from the analog memory 82 to the second analog memory 84 while maintaining the information in the analog memory 82. The analog voltage on the lead 101 indicated by a waveform 346 which was applied to the first analog memory 82 substantially at time $t_0$ is applied through the lead 200 to the base of the transistor 214. Simultaneously the analog input voltage of the waveform 336 is applied to the base of the transistor 212 through the lead 208. The transistors 212 and 214 are both conductive and a relatively high voltage is applied to the base of the transistor 240 because the relatively low voltage of the waveform 346 maintains the transistor 214 less conductive than the transistor 212. In response to the relatively low voltage at the base of the transistor 242 the transistor 254 is highly conductive maintaining a voltage slightly above ground on the lead 258. Thus at time $t_1$ in response to the pulse of the waveform 344 a positive signal is not applied through the gate 262 and the input register 190 is not triggered to the "zero" state. The input register 190 remains at the "one" state and the first binary output signal of a waveform 348 is applied to the lead 276 and through the delay line arrangement as the signal of the waveform 338. Thus in response to the pulse of the waveform 340 at time $t_2$ the flip flop 298 may be triggered to a binary "one" state representing the first binary equivalent of the analog voltage of the waveform 336.

At time $t_2$ in response to the signal of the waveform 340 the input register flip flop 190 remains at the binary "one" state. It is to be noted that if the register 190 were at the "zero" state it would be triggered to the binary "one" state at time $t_2$. Also in response to the signal of the waveform 342 on the lead 272 the first switch 88 is closed and the second switch 106 is opened. Thus the analog equivalent of a binary "one" as weighted by the resistor 40 is again applied to the lead 64 and in combination with the accumulated analog voltage of the waveform 346 is summed in the summer 70 and stored in the first analog memory 82.

At time $t_3$ in response to the switching pulse of the waveform 342 on the lead 272 the first switch 88 is again opened and the second switch 106 is closed storing the voltage in the memory 82 in the second analog memory 84. Also starting at time $t_2$ the stored voltage of the waveform 346 is applied through the lead 200 to the base of the transistor 214. The analog input voltage of the wave form 336 is maintained on the lead 208. Because the voltage on the base of the transistor 214 is less than the voltage on the lead 208, the transistor 240 remains less conductive, the transistor 242 relatively more conductive than the transistor 240 and a positive voltage on the base of the transistor 254 maintains that transistor conductive. Thus in response to the pulse of the waveform 344 applied to the gate 262 through the lead 266 shortly after time $t_3$ a positive signal is not gated therethrough because of the substantial ground voltage on the lead 258. As a result the input register flip flop 190 remains in the binary "one" state and at time $t_4$, the binary "one" voltage of the wave form 348 is applied to the gate 290 as a delayed voltage of the wave form 338. Thus at time $t_4$ in response to the pulse of the waveform 340, the gate 290 applies a positive voltage to the flip flop 298 to trigger that flip flop to the binary "one" state. Also shortly after time $t_3$, the pulse of the waveform 344 activates the counter control circuit 54.

At time $t_4$ which is the beginning of a sequential half cycle of operation, the switch control circuit 148 responds to the pulse of the waveform 342 to close the first switch 88 and open the second switch 106. Thus the analog equivalent of a binary "one" in the third-bit place as determined by the resistor 42 is applied to the lead 64 and to the summer 70. The stored analog voltage of the waveform 346 is applied through the lead 78 to the summer 70 and the summed analog voltage of the waveform 346 is stored in the first analog memory 82.

At time $t_5$ in response to the signal of the waveform 342 the switch 88 is again opened and the switch 106 is closed to establish the analog voltage of the waveform 346 in the second analog memory 84. The analog voltage of the waveform 346 is applied to the base of the transistor 214 and the analog input voltage of the waveform 336 is applied to the base of the transistor 212. However, because the analog voltage of the waveform 346 is larger than the input voltage of the waveform 336, the differential operation causes the voltage to rapidly drop on the base of the transistor 240 and to rise on the base of the transistor 242. The voltage falls a substantial amount on the base of the transistor 254 rendering that transistor non-conductive and providing a sudden rise of voltage on the lead 258. Thus shortly after time $t_5$ in response to the pulse of the wave form 344 a positive trigger voltage (not shown) is applied from the gate 262 to the lead 268 to trigger the input register 190 to the binary "zero" state. Thus the voltage on the lead 276 falls as shown by the waveform 348. At time $t_6$ the delayed voltage of the waveform 338 is applied to the flip flop 298 in response to the pulse of the waveform 340 and that flip flop is triggered to the binary "zero" state. Therefore, the binary equivalent of 1 1 0 has been transferred into the utilization system 290. It is to be noted that a reset pulse similar to the waveform 318 may be applied to the system at a time interval subsequent to time $t_6$ before applying another analog input into the system from the source 206.

Thus the output signal of the digital-to-analog converter is periodically compared with the analog input voltage after each substitution of a trial binary "one" into the input register 190. If, after the comparison, the voltage of the digital-to-analog converter is less than the analog input voltage the binary "one" is maintained in the input register 194. However, when the comparison shows that the accumulated output voltage of the digital-to-analog converter is greater than that of the analog input voltage, indicating that the input digit ought to have been "zero" the input register 194 is triggered to the "zero" state. The series of binary states maintained in the input register 194 at the end of each comparison forms the digital equivalent of the analog input voltage. It is to be noted that the arrangement of FIG. 3 forms a digital equivalent number from the most significant to the least significant digit as this type of conversion is required with the illustrated summing operation.

Referring now to FIGS. 4 and 5, the analog-to-digital conversion system operates similar to that of FIG. 3 except the digital-to-analog conversion arrangement of FIG. 2 is utilized. At time $t_0$, in response to the pulse of the waveform 340 applied to the lead 312 the input register 190 is triggered to the binary "one" state. Also in response to the pulse of the waveform 342 the switch control circuit 148 responds to close the first switch 88 and to open the second switch 106. The analog input voltage of the waveform 336 is applied from the source 206 through the lead 208 to the comparator 202. In response to the summer 70 the analog voltage of the waveform 346 is stored in the first analog memory 82.

At time $t_1$ in response to the switch control pulse of the waveform 342 the first switch 88 is opened and the second switch 106 is closed to store the voltage of the waveform 346 in the second analog memory 84. Also at time $t_1$ the stored analog voltage is applied through the lead 200 to the comparator 202 having been applied thereto from approximately time $t_0$. In response to the pulse of the waveform 344, a trigger pulse is not applied to the lead 268. Thus the input register 190 remains at the binary "one" state indicated by the upper level of the waveform 348. At time $t_2$ the input register 190 is again reset in response to the pulse of the waveform 340 applied to the lead 312 and the switches 88 and 106 are respectively closed and opened. The summer 70 responds to the analog equivalent of the binary "one" and the weighted voltage stored in the analog memory 84 after multiplication by 2 in the amplifier 178 to apply the accumulated analog voltage of the waveform 346 to the first analog memory 82. Similarly at time $t_3$ the stored voltage in the memory 82 is also stored in the second analog memory 84. The comparator gate 262 is opened in response to the pulse of the waveform 344 applied from the lead 308 and because the voltage of the waveform 346 is less than the analog input voltage of the waveform 336 at time $t_3$ the input register 190 remains at the binary "one" state.

At time $t_4$ in response to the pulse of the waveform 340 applied from the source 306 through the lead 314 to the gate 290 a binary "one" is again transferred to the flip flop 298. It is to be noted that the delay arrangement such as formed by the resistor 278 and the capacitor 286 is required because the pulse of the waveform 340 also resets the input register 190 at time $t_4$. Also at time $t_4$ the summer 70 responds to apply the analog voltage of the waveform 346 to the first analog memory 82. Thus at time $t_5$ in response to the pulse of the waveform 344 the comparator gate 262 is opened and because the stored analog voltage of the waveform 346 is higher than the input analog voltage of the waveform 336 a positive trigger pulse (not shown) is applied through the lead 268 to trigger the input register flip flop 190 to the "zero" state. Thus at time $t_6$ in response to the pulse of the waveform 340 the state of the register 190 indicated by the waveform 348 and the delayed waveform of the waveform 338 triggers the flip flop 298 to the "zero" state. The digital equivalent of the analog input voltage applied from the source 206 has now been sequentially transferred to the utilization system 292. A reset pulse similar to the waveform 318 may be applied through the lead 315 to discharge the second analog memory 84 at a time period subsequent to time $t_6$ in order to start a new digital determination of an analog input voltage. It is to be noted that in the analog-to-digital arrangement of FIG. 4 a digital equivalent number is formed from the most significant to the least significant digit as this type of operation is required with the illustrated accumulating arrangement.

It is to be noted that the examples are based upon a three-bit operation for convenience of explanation but any selected number of binary bits may be utilized in accordance with the principles of this invention. Also this invention is not to be limited to binary numbers but may include coded binary numbers by suitable circuit modifications. It is to be further noted that the various equipment arrangements are for illustrating the invention and other circuit arrangements may be utilized within the principle of this invention. For example, a Schmitt trigger arrangement as well known in the art may be utilized for the comparator circuit 202 or other binary counter arrangements may be utilized in place of the counters of FIGS. 1 and 3. Also, gates, switches and relays may be used interchangeably.

The illustrative analog-to-digital system operations described above provide an error that is not greater than that of one-bit or of the trial value in the least significant digit position. The error in the analog-to-digital arrangements as shown causes the magnitude of the digital quantity to be less than the magnitude of the analog input quantity. The conversion operation in FIGS. 1 and 2 of digital-to-analog quantities does not have an inherent error.

Thus there has been described improved digital-to-analog and analog-to-digital converter systems that require only single-bit input registers and operate serially with two analog storage memories with a high degree of accuracy. Because of the arrangement of the analog storage memories and the first and second switches which allow storage of intermediate analog signals, the stored analog information is transferred accurately and reliably and the system operation is not critically dependent upon rates of charge or discharge. The arrangements in accordance with this invention are readily adaptable to operation of most significant to least significant digit or least significant to most significant digit in sequence in the conversion from digital-to-analog values. Also, the arrangements in accordance with this invention are adaptable to any desired binary or coded decimal coding system for conversion in either direction between binary and decimal values. Therefore, by utilizing analog storage, a highly reliable and accurate system is provided with a minimum of equipment.

What is claimed is:

1. A converter responsive to a sequence of binary input signals representative of a digital number to develop an equivalent analog voltage comprising an input flip flop responsive to the binary input signals, analog weighting means coupled to said input flip flop and responsive to the binary states thereof, counting means coupled to said weighter circuit for providing a selected sequence of analog weighting of the binary input signals so as to represent the digital number, summing means coupled to said weighter circuit, first and second analog memories, a first switch coupled between said first and second analog memories, a second switch coupled between said summing means and said first analog memory, said second analog memory coupled to said summing means, and switch control means coupled to said first and second switches for opening and closing said respective first and second switches during a first half cycle and for closing and opening said respective first and second switches during a second half cycle, said summing means responding to the weighted input signal and a signal stored in said second analog memory to store a summed signal in said first analog memory during said first half cycle and to store said summed signal in said second analog memory during said second half cycle.

2. A digital-to-analog conversion system comprising a source of sequential binary signals representative of a digital number, an input flip flop coupled to said source of binary signals, timing means coupled to said source of binary signals and to said input register for sequentially triggering said input flip flop to a selected first binary state, an analog weighter circuit coupled to said input flip flop, counting means coupled to said timing means and to said analog weighter circuit for sequentially changing the analog weighting of analog equivalent signals of the state of said input flip flop, summing means coupled to said analog weighting circuit, first and second analog memories, a first switch coupled between said first and second analog memories, a second switch coupled between said summing means and said first analog memory, said second analog memory coupled to said summing means, and switch control means coupled to said timing means and to said first and second switches to open and close said respective first and second switches during a first period of a plurality of alternate first and second periods so that a summed signal of the weighted binary equivalent signal and an accumulated analog signal stored in said second analog memory is stored in said first analog memory, and to close and open said respective first and second switches so that the summed signal is stored in said second analog memory, the analog voltage stored in said second memory representing the analog equivalent signal of the digital number.

3. A system for converting a sequence of binary input signals representative of a digital number to an analog signal comprising an input flip flop responsive during each of a plurality of cycles to the sequence of binary input signals, weighting means coupled to said input flip flop to develop analog signals of said binary input signals, summing means coupled to said weighting means, first and second analog memory means, first switching means coupled between said first and second analog memory means, second switching means coupled between said summing means and said first analog memory means, multiplication means coupled between said second analog memory means and said summing means, and switch control means coupled to said first and second switching means for respectively opening and closing said first and second switches during a first half of each cycle and for respectively closing and opening said first and second switches during a second half of each cycle, said summing means responding to the analog input signal and a signal stored in said second analog memory after multiplication by said multiplying means to store a combined signal in said first analog memory means during each first half cycle, said combined signal being stored in said second analog memory during each second half cycle, the combined analog signal stored in said second analog memory means at the end of the sequence of binary input signals being representative of the digital number.

4. A digital-to-analog conversion system comprising a source of sequential binary information representative of a binary number, an input flip flop coupled to said source of binary information, timing means coupled to said source of information and to said input register for sequentially triggering said input flip flop to a selected first or second binary state, an analog weighter circuit coupled to said input flip flop to develop analog voltages representative of the first or second states of said flip flop, summing means coupled to said analog weighter circuit, first and second analog memories, a first switch coupled between said first and second analog memories, a second switch coupled between said summing means and said first analog memory, multiplying means coupled between said second analog memory and said summing means for providing a fixed weighting of analog voltages stored in said second analog memory, and switch control means coupled to said timing means and to said first and second switches to open and close said respective first and second switches during a first period of a plurality of alternate first and second periods so that a summed voltage of the weighted binary voltage and an analog voltage stored in said second analog memory is stored in said first analog memory, and to close and open said respective first and second switches so that said summed voltage is stored in said second analog memory, the analog voltage stored in said second analog memory representing the analog equivalent voltage of the binary number.

5. A device for sequentially combining a series of analog input signals comprising first means for storing a first signal, second means for storing a second signal, feedback means for responding to said second signal to provide a signal, summing means for responding to the signal from said feedback means and said analog input signal to develop said first signal, first switching means for applying said first signal from said summing means to said first means, second switching means for applying said first signal in said first means to said second means, and means for controlling said first and second switching means for closing and opening said respective first and second switching means during a first period and for opening and closing said respective first and second switching means during a second sequential period.

6. A device for sequentially combining a series of analog input signals comprising first memory means for storing a first sum signal, second memory means for storing a second sum signal, summing means for responding to the analog input signals and said second sum signal for developing said first sum signal, first switching means for applying the first sum signal to said first memory means, second switching means for applying said first sum signal in said first memory means to said second memory means as said second sum signal, and means for controlling said first and second switching means to respectively close and open during first periods to apply said first sum signal to said first memory means and to respectively open and close during second periods alternating with said first periods for storing said second sum signal in said second memory means.

7. A device for sequentially combining a series of analog input signals comprising summing means for responding to a first signal and one of said analog input signals for developing a second signal, first means for storing said second signal, second means for sequentially storing said second signal, first switching mean for applying said second signal from said summing means to said first means, second switching means for applying the second signal in said first means to said second means, feedback means for responding to the second signal stored in said second means to apply said first signal to said summing means, and control means for controlling said first and second switching means for closing and opening said respective first and second switching means during a first period and for opening and closing said respective first and second switching means during a second sequential period.

8. A conversion system responsive to a source of analog input voltages and operable during a first and a second sequential period of a sequence of repeating first and second periods comprising first and second analog memory means for respectively storing a first signal during said first sequential period and a second signal during said second sequential period, means responsive during said first sequential period to the analog input voltage and a second signal from the previous repeating sequence to develop said first signal, first switching means for closing during said first period to apply said first signal to said first memory means and for opening during said second period, and second switching means for closing during said second period to apply said second signal to said second memory means and for opening during said first period.

9. A digital-to-analog conversion device responsive to a sequence of binary signals of selected binary significance comprising binary input register means for sequentially storing binary bits representative of the binary signals, first analog memory means for storing a sum during a first period, second analog memory means for storing a sum during a second period, combining means for responding to said binary input register and to said second memory means for developing a sum of analog voltages sequentially equivalent to accumulated analog voltages representative of said binary pulses, first switching means for closing during a first period to apply the sum developed by said combining means to said first memory means and for opening during a second period, second switching means for closing during said second period to apply said sum stored in said first memory means to said second memory means and for opening during said first period, and means for controlling said first and second switching means to combine said sum stored in said second memory means and said analog voltage equivalent of said binary input pulse for storing the sum in said first memory means during said first period, and to store the sum in said second memory means during said second period.

References Cited by the Examiner

UNITED STATES PATENTS

| | | | |
|---|---|---|---|
| 3,019,426 | 1/1962 | Gilbert | 340—347 |
| 3,059,233 | 10/1962 | Bell | 340—173 |
| 3,098,224 | 7/1963 | Hoffman | 340—347 |

MAYNARD R. WILBUR, *Primary Examiner.*

DARYL W. COOK, MALCOLM A. MORRISON, *Examiners.*

A. L. NEWMAN, *Assistant Examiner.*